April 6, 1954

A. MASON ET AL 2,674,099

POSITIONING APPARATUS

Filed March 28, 1952

INVENTORS:
ABRAHAM M. FUCHS
AVREL MASON

BY Ellsworth R. Roston

ATTORNEY

April 6, 1954
A. MASON ET AL
2,674,099
POSITIONING APPARATUS
Filed March 28, 1952
2 Sheets-Sheet 2
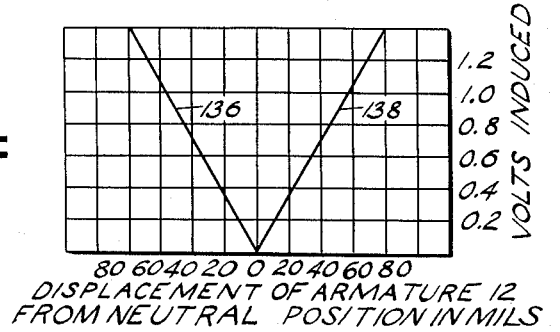
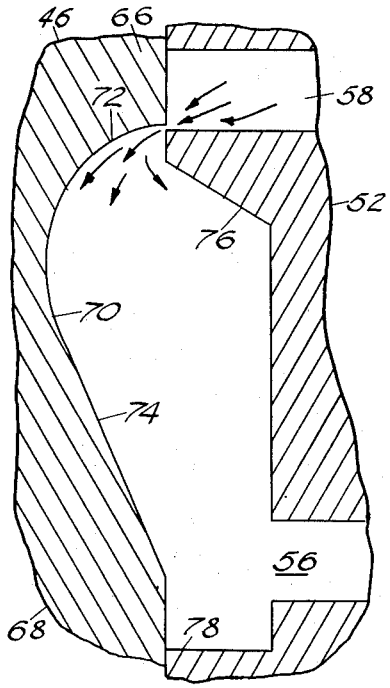
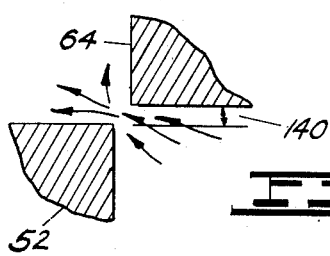
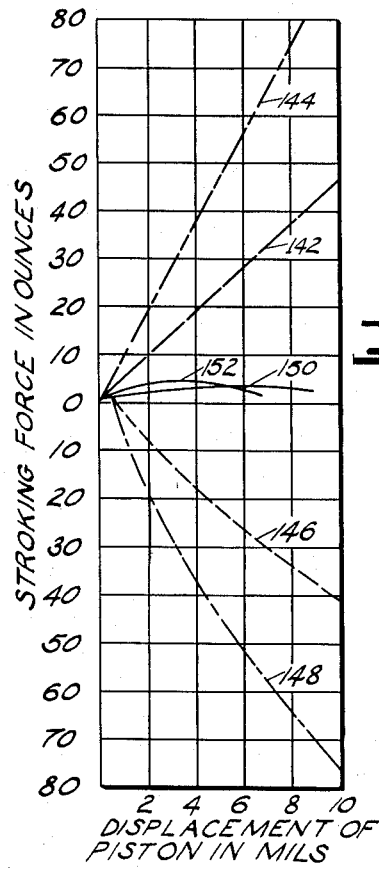
INVENTORS:
ABRAHAM M. FUCHS
AVREL MASON
BY
Ellsworth R. Roston
ATTORNEY Patented Apr. 6, 1954

2,674,099

UNITED STATES PATENT OFFICE 2,674,099

POSITIONING APPARATUS

Avrel Mason, Birmingham, Mich., and Abraham M. Fuchs, New York, N. Y., assignors to Bendix Aviation Corporation, Detroit, Mich., a corporation of Delaware Application March 28, 1952, Serial No. 279,132

11 Claims. (Cl. 60—97)

This invention relates to a system for controlling the operation of a plurality of output members in accordance with the movements of a single input member. More particularly, the invention relates to a system for simultaneously and accurately guiding the movements of a plurality of tool heads in a complex pattern at high speeds in accordance with the movements of a master cam.

During the past few years, rapid advances have been made in certain fields, such as in automatic transmissions and jet engines. These advances have caused the demands for products in the new fields to rise considerably. However, industry has been experiencing difficulty in meeting such demands because of the complex machining problems involved. For example, accuracies of one thousandth of an inch or less are being specified for components in production instead of accuracies of several thousandths of an inch as in previous products. Furthermore, such parts have to be produced at relatively high speeds and in somewhat complex shapes.

In co-pending application Serial No. 272,591, filed by Abraham M. Fuchs, dated February 20, 1952, a system is disclosed for accurately guiding the cutter head of a tool over a workpiece in a complex pattern in accordance with the movements of a master cam. The system disclosed in the above application accurately guides the tool head by generating an electrical signal having an amplitude determined by the movements of the master cam. Although the amplitude of the electrical signal is small, it controls the application of a large amount of hydraulic power which drives the tool head. The tool head in turn acts on the electrical generator to minimize the amplitude of the generated signal.

This invention provides a system for simultaneously guiding the movements of a plurality of tool heads in accordance with the movements of a master cam. The system operates on the tool heads by utilizing one control system similar to that disclosed above as a master control and by utilizing a plurality of similar systems as subsidiary controls for guiding the different tool heads. Each subsidiary system operates in accordance with the instructions from the master control but independently of the operation of the other subsidiary systems. The accuracy produced by simultaneously guiding a plurality of tool heads is almost as great as that produced in directing the movements of a single tool head.

An object of this invention is to provide a system for accurately guiding the movements of a plurality of output members in accordance with the movement of a single input member.

Another object of this invention is to provide a system of the above character for accurately directing a plurality of tool heads over the surfaces of a plurality of workpieces in accordance with the pattern provided by a master cam.

A further object is to provide a system of the above character for simultaneously cutting a plurality of workpieces in a complex pattern with tolerances of as little as one thousandth of an inch or less.

Still another object is to provide a system of the above character requiring only a single cam made from relatively soft and inexpensive material to accurately control the simultaneous production of similar patterns in a plurality of workpieces.

A still further object is to provide a system of the above character requiring the production of only a relatively small amount of power to control the simultaneous applications of large amounts of power from a plurality of sources to accurately drive a plurality of tool heads in a complex pattern.

Other objects and advantages will be apparent from a detailed description of the invention and from the appended drawings and claims.

In the drawings:

Figure 1 is a somewhat schematic diagram, partly in block form and partly in section, illustrating the electrical, mechanical and hydraulic features which together constitute one embodiment of the invention;

Figures 2 and 3 are enlarged sectional views of certain hydraulic components shown in Figure 1 and illustrate in further detail the operation of these components;

Figure 4 is a diagram of curves illustrating the linear reaction of certain electrical components shown in Figure 1 to the movements of a master cam; and Figure 5 is a diagram of curves illustrating the individual operation of the hydraulic components shown in Figures 2 and 3 and the advantages accruing from obtaining a composite reaction of these components.

In one embodiment of the invention, a master cam 10 is adapted to move the armature 12 of a transformer, generally indicated at 14, in accordance with its own pattern. The armature 12 is made from a suitable magnetic material and is disposed within a non-magnetic core 16 of the transformer 14. A plurality of windings 18, 20, 22 and 24 are disposed on the core 16 such that the windings 18 and 22 are interleaved on one side of the core and the windings 20 and 24 are interleaved in a similar manner on the other side of the core.

The inner terminals of the windings 18 and 20 are connected together and the outer terminals of the windings are connected to the output terminals of a signal generator 26. Connections are also made from the inner terminal of the winding 22 to the outer terminal of the winding 24 and from the outer terminal of the winding 22 and the inner terminal of the winding 24 to the input terminals of an amplifier 28.

Signals from the amplifier 28 are introduced to a detector 30, the output from which is applied either directly or through suitable D. C. amplifiers (not shown) to the outer terminals of windings 32 and 34 in a torque motor, generally indicated at 36. The inner terminals of the windings 32 and 34 are connected to an output terminal of a direct power supply 38. The windings are disposed on opposite legs of an armature 40 pivotable at a central position on a pin 42. The armature 40 is separated by relatively small air gaps from yokes 44 and 46 forming part of a horseshoe magnet (not fully shown).

Pistons 48 and 50 are pivotably secured to the ends of the armature 40. The piston 48 is housed within a sleeve 52 having an inlet conduit 54 and an outlet conduit 56. A connecting conduit 58 is provided in the sleeve 52 above the inlet conduit 54, and a connecting conduit 60 is provided in the sleeve intermediate the conduits 54 and 56. Spools 64, 66 and 68 are provided on the piston 48 so as to be adjacent the conduits 58, 60 and 56, respectively, in the inoperative position of the piston.

A portion 70 connects the spools 66 and 68. The portion 70 has a relatively steep indentation 72 (Figure 2) adjacent the spool 66 and a relatively shallow indentation 74 adjacent the spool 68. The indentations 72 and 74 communicate with each other by a curved portion intermediate the indentations. An oblique cut 76 is made in the sleeve 52 adjacent the indentation 72, and a rectangular cut 78 is made in the sleeve adjacent the indentation 74.

In a similar manner the piston 50 fits in a sleeve 80 having an inlet conduit 82, an outlet conduit 84 and connecting conduits 86 and 88 similar to the conduits 54, 56, 58 and 60, respectively. Spools 90, 92 and 94 similar in construction and disposition to the spools 64, 66 and 68, respectively, are provided on the piston 50. A portion 96 corresponding to the portion 70 connects the spools 92 and 94.

A channel 98 communicates with both the conduits 60 and 86 and a channel 100 communicates with the conduits 58 and 88. The channels 98 and 100 lead to opposite faces of a piston 102 in a ram, generally indicated at 104. The piston 102 drives a rod 106 connected to the core 16 of the transformer 14 and to the perimeter of a wheel 108.

A plurality of bell crank levers 110 are connected at spaced intervals to the periphery of the wheel 108. Each lever 110 is pivotable at an intermediate position on a fixed bracket 112. At its outer end, each lever 110 is pivotably secured to an armature 114 of a transformer, generally indicated at 116. Each transformer 116 has a core 118 similar to the core 16 of the transformer 14 and also has a plurality of windings wound on the core 118 in a manner similar to the windings 18, 20, 22 and 24 of the transformer 14.

The output from each transformer 116 is introduced, through amplifiers and detectors similar to the amplifier 28 and detector 30, to an associated torque motor, generally indicated at 120. Each torque motor 120 is similar in construction to the torque motor 36 and is adapted to operate on force-compensated valves similar to the valves disclosed above. Pistons 122 in rams, generally indicated at 124, are driven in accordance with the operation of the force-compensated valves. The pistons 122 and the rams 124 are similar to the piston 102 and ram 104, respectively.

Each piston 122 is connected to a rod 126 adapted to drive the head 128 of a tool (not shown). A cutter 130 is provided on each of the tool heads 128 to cut a workpiece 132 adjacent the cutter in accordance with the movements of the head. Each head 128 is also connected to the core of the transformer 116 associated with it, so as to drive the core in accordance with the movements of its associated piston 122.

In its neutral position, the armature 12 is positioned intermediate the secondary windings 22 and 24 of the transformer 14. Because of this intermediate positioning and because of the symmetrical arrangement of the windings 22 and 24, voltages of equal magnitude and opposite polarity are induced in the windings by the current flowing through the primary windings 18 and 20 from the signal generator 26. Since the voltages have an equal magnitude and opposite polarity, they are cancelled when introduced to the amplifier 28.

When the armature 12 is moved to either side of its neutral position by the cam 10, the voltages induced in the secondary windings 22 and 24 no longer have equal amplitudes. The difference between the induced voltages is substantially proportional to the displacement of the armature 12 from its neutral position because of the symmetrical disposition of the windings 22 and 24 on the non-magnetic core 16.

In one particular embodiment of the transformer 14, a linear relationship exists between the signal from the transformer and the displacement of the armature 12 with errors of less than 1% for armature displacements up to 40 mils from each side of the neutral position. A substantially linear relationship exists in this embodiment with errors slightly greater than 1% for armature displacements as high as 80 mils. The linear relationship for this embodiment between the output signals from the transformer and the armature displacement is illustrated at 136 and 138 in Figure 4 for each side from the neutral position. In other embodiments of the transformer 14, the difference between the voltages induced in the windings 22 and 24 may be substantially proportional to displacements of the armature 12 for armature movements considerably greater than 80 mils. However, the error in such embodiments of the transformer may be slightly greater than the error of 1% disclosed above.

The difference signal passing through the amplifier 28 is detected and then introduced to the windings 32 and 34 as direct currents proportionate to the amplitude of the signal. The currents are produced in a push-pull arrangement in the detector 30 such that the current through the winding 32 is equal in amplitude but opposite in polarity to the current through the winding 34. Because of the opposite polarities, the current through one winding aids the direct current passing through the winding from the power supply 38, and the current through the other winding opposes the direct current from the power supply.

The resultant unbalance in the currents through the windings 32 and 34 causes magnetic fields of unequal strengths to be produced by the currents. The magnetic fields act on the armature 40 to produce a pivotal movement of the armature on the pin 42 proportional to the difference between the magnetic fields.

When the unbalance in the windings 32 and 34 is in such a direction as to produce a counter-clockwise pivotal movement of the armature 40, the piston 48 moves upwardly. This causes the spools 64 and 66 to move away from the connecting conduits 58 and 60, respectively, so that they no longer block the conduits. As a result, a continuous hydraulic circuit is established which includes the inlet conduit 54, the connecting conduit 58, the channel 100, the ram 104, the channel 98, the connecting conduit 60 and the outlet conduit 56. As the hydraulic fluid flows through the ram 104, it produces a force on the piston 102 in a direction to move the piston to the right. Similarly, the piston 102 moves to the left when the piston 50 is driven upwardly as a result of a pivotal movement by the armature 40 in a clockwise direction.

As will be seen in Figure 3, a slight gap 140 is produced between the spool 64 and the connecting conduit 58 as the piston 48 moves upwardly in Figure 1. Since the gap 140 is relatively small, the fluid passing from the inlet conduit 54 to the conduit 58 converges at the gap. This causes the velocity of the fluid to increase at the gap 140, and the increase in velocity of the fluid produces an increase in fluid momentum. This increase in momentum in turn produces a force opposing any increase in the width of the gap 140. Since the fluid flows through the gap 140 at an oblique angle relative to the axis of the piston 48 and sleeve 52, the opposing force produced by the fluid has a component along the piston axis. The axial components of force are illustrated at 142 and 144 in Figure 5 for fluid pressures of 1,000 and 2,000 lbs. per square inch, respectively.

The opposing force produced by the fluid at the gap 140 is effectively counteracted by a force produced by the fluid as it flows through the connecting portion 70. The counteracting force is produced because the velocity of the fluid increases as the fluid flows from the relatively steep indentation 72 to the relatively shallow indentation 74. This force also has a component along the axis of the piston 48. The axial components of the counteracting force are illustrated at 146 and 148 in Figure 6 for fluid pressure of 1,000 and 2,000 lbs. per square inch, respectively.

By adjusting the angles of the indentations 72 and 74, the counter acting force can be made almost equal to the opposing force at the gap 140 so that an opposing force of relatively small magnitude results. Such a slight opposing force is desirable to increase the stability in the operation of the hydraulic circuit. The slight opposing forces are illustrated at 150 and 152 in Figure 6 for fluid pressures of 1,000 and 2,000 lbs. per square inch, respectively. The operation of the force-compensated valve to produce the slightly opposing forces 150 and 152 is fully disclosed in co-pending application Serial No. 222,591, filed April 24, 1951, by Shih-Ying Lee.

When the piston 102 moves to the left or right in Figure 1, it drives the core 16 and the windings on the core in the same direction. By following the piston 102, the core 16 moves in a direction to reduce the relative displacement between it and the armature 12 so as to minimize any electrical signal that may have been produced in the transformer 14. In this way a closed servomechanism loop is produced in which a member such as the piston 102 is driven in accordance with an error signal and in a direction to minimize the signal.

The piston 102 also drives the wheel 108 to produce a rotary movement of the wheel. As the wheel moves, it causes each of the bell crank levers 110 to pivot on its associated bracket 112. The pivotal movements of the different levers 110 in turn cause the different armatures 114 to be moved axially in a pattern following the movements of the wheel 108. Since the armatures 114 all have substantially similar movements, they cause voltages of substantially equal amplitudes to be induced in the different transformers 116. These signals act on the pistons 122 in the rams 124 in a manner similar to that disclosed above for the piston 102, thereby producing corresponding movements for the different pistons.

The tool heads 128 follow the movements of the pistons 122 and in turn move the cutters 130 towards and away from the workpieces 132 in a pattern determined by the rotational movements of the wheel 108. Since the wheel 108 accurately follows the movements of the master cam 10, all of the workpieces 132 are cut in a pattern corresponding substantially to that determined by the master cam. In addition to moving the cutters 130, the heads 128 move the cores 118 and the windings on the cores in a direction to minimize the error signals produced in the transformers 116.

The system disclosed above has several important advantages. It produces an electrical signal having an amplitude corresponding to the movements of an input member, such as the master cam 10. Although the electrical signal has a relatively small amplitude, it accurately controls the application of a relatively large force, such as that produced by the ram 104. The large force in turn controls the movements of a plurality of output members, such as the tool heads 128.

Because of the production of a relatively small signal to control the application of a large driving force, the cam 10 has very little pressure applied to it and very little heat developed in it from friction. As a result, the cam can be operated at relatively high speeds without any danger that it will lose its shape, even when it is made from relatively soft and inexpensive materials. The accuracy is maintained in the system even at high speeds since the system responds quickly and reliably to movements of the cam 10.

In addition to the above advantages, the apparatus disclosed above is capable of providing high accuracies in the movements of the tool heads 128 for displacements of the heads considerably greater than the linear ranges of the transformer 14 and the transformers 116. For example, the tool heads 128 can accurately follow the movements of the cam 10 through a distance of several inches even though the transformers produce a signal linearly related to displacements of their armatures for armature movements of approximately only 80 mils to each side of their neutral positions. This results from the fact that the core 16 and the cores 118 follow the movements of their associated armatures to minimize at all times the amplitudes of the signals produced in the transformers.

As disclosed above, a plurality of tool heads are operated by utilizing one primary control system to direct the movements of a plurality of subsidiary systems similar in construction to the primary system. Since both the primary and subsidiary systems have accuracies of a very high order, the tool heads accurately follow the movements of the master cam 10 even though they are not directly controlled by the cam. Furthermore, the movements of the tool heads are accurate since each subsidiary system operates independently of the other subsidiary systems and has its own feedback loop to correct any errors that may be produced in the movements of its associated tool head.

It should be realized that other input members than the cam 10 and other output members than the tool heads 128 may be utilized. Other valves than the force-compensated valves disclosed above may also be utilized, but a greater force may be required to drive these valves because the internal forces opposing the operation of the valves may not be as closely compensated as in the valves disclosed above. In addition, other linkages then the wheel 108 and the bell crank levers 110 may be used to transmit motion from the primary to the subsidiary systems. For example, the rod 106 may be provided with a ratchet gear at its end to drive a pinion gear replacing the wheel 108.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. Positioning apparatus, including, input means, means adapted to be driven in accordance with movements of the input means, a plurality of motion sensors each including first and second members movable relative to each other, each of the first members being responsive to variations in the movements of the driven means to effectuate the production by the motion sensor of an electrical signal having an amplitude substantially proportional to such variations, a plurality of motors each actuated in accordance with the amplitude of a different electrical signal, means driven by each motor, and a plurality of output means each adapted to follow the movement of a different motor-driven means and to drive the second member in its associated motion sensor in a direction to reduce the amplitude of the generated signal.

2. Positioning apparatus, including, input means, a plurality of motion sensors each including first and second members movable relative to each other to produce an electrical signal having an amplitude dependent upon their relative movement, the first member in a predetermined one of the sensors being responsive to movements of the input means to produce a corresponding displacement relative to the second member, a motor actuated in accordance with the amplitude of the electrical signal, means driven by the motor and adapted to drive the second member in the predetermined sensor in a direction to minimize the electrical signal, control means adapted to be displaced in accordance with the movements of the driven means, the first means in each of the sensors other than the predetermined sensor being responsive to variations in the movements of the control means to effectuate the production by its sensor of an electrical signal having an amplitude substantially proportional to such variations, a plurality of motors each actuated in accordance with the amplitude of the electrical signal from a different one of the last mentioned sensors, a plurality of means each driven by a different motor, and a plurality of output means each adapted to follow the movements of a different driven means and to drive the second member in the associated motion sensor in a direction to reduce the amplitude of the signal produced by the sensor.

3. Positioning apparatus, including, input means, control means, means for displacing the control means in accordance with movements of the input means, a plurality of first members adapted to be driven by the control means from a neutral position, a plurality of output means, a plurality of second members each associated with a different first member and adapted to be driven by an associated output means from a neutral position so as to minimize any displacement between it and its associated first member, a plurality of motion sensors, each including a predetermined one of the first members and a predetermined one of the second members and adapted to produce a signal having an amplitude substantially proportional to the relative displacement between the members, means for applying a force on each output means to produce a displacement of the output means, and means for controlling the force applied on each output means in accordance with the amplitude of the signal generated by the associated sensor to produce a displacement of the output means substantially proportionate to the displacement of the input means.

4. Positioning apparatus, including, input means, control means, means for displacing the control means in accordance with movements of the input means, a plurality of motion sensors each having first and second members movable relative to each other to produce an error signal having an amplitude related to their relative displacement, the first member being associated with the control means to provide a relative displacement between it and the second member in accordance with movements of the input means, means for producing a plurality of driving forces, means for controlling the amplitude of each driving force in accordance with the amplitude of the error signal in an associated member, and a plurality of output means each adapted to be displaced in accordance with the amplitude of a different driving force and to produce a displacement of the second member in an associated sensor in a direction to minimize the amplitude of the error signal produced in the sensor.

5. Positioning apparatus, including, input means, a plurality of motion sensors each including first and second members movable relative to each other to produce an error signal having an amplitude proportional to their relative displacement, a plurality of driving means each associated with a different sensor, means for controlling the force produced by each driving means in accordance with the error signal produced by the sensor, a plurality of rams each having a piston adapted to be displaced in accordance with the force produced by a different driving means, the first member in a predetermined one of the sensors being adapted to be displaced in accordance with the movements of the input means so as to provide a relative displacement between it and the second member in the sensor and the second member being adapted to be displaced in accordance with movements of the associated piston and in a direction to minimize the error signal produced by the sensor, control means adapted to be driven in accordance with the movements of the piston associated with the predetermined sensor and to produce corresponding movements of the first members relative to the second members in the other sensors, and a plurality of output means each adapted to be driven in accordance with the movements of a different piston and to drive the second member in an associated sensor in a direction to minimize the error signal in the sensor.

6. Positioning apparatus, including, input means, a plurality of motion sensors, each motion sensor including first and second members movable relative to each other to produce an error signal having an amplitude proportional to their relative displacement, a plurality of means for producing driving forces, means for varying each driving force in accordance with the amplitude of the error signal from a different motion sensor, the first member in a predetermined one of the sensors being associated with the input means to produce a relative displacement between it and the second member in accordance with the motion of the input means, a piston associated with the predetermined motion sensor and adapted to be driven by the driving force controlled by the sensor, the second member in the predetermined sensor being adapted to be driven by the piston in a direction to minimize the error signal, control means adapted to be driven in accordance with the movements of the piston and to control the movements of the first members in the sensors other than the predetermined sensor, and a plurality of output means each adapted to be displaced in accordance with a different driving force and to produce a displacement of the second member in an associated sensor in a direction to minimize the signal produced in the sensor.

7. Positioning apparatus, including, input means, a motion sensor including first and second members movable relative to each other to produce an error signal having an amplitude dependent upon their relative displacement, the first member in the sensor being adapted to follow the movements of the input means to produce a relative displacement between it and the output means, a ram including a piston, means for converting the error signal into a proportionate displacement of the piston in the ram, the second member in the motion sensor being operative in accordance with movements of the piston to be displaced in a direction to minimize the relative displacement between it and the first member in the sensor, control means driven by the output means, a plurality of motion sensors, each motion sensor in the plurality including first and second members movable relative to each other to produce an error signal having an amplitude dependent upon their relative displacement, the first member in each sensor in the plurality being adapted to follow the movements of the control means, a plurality of rams each associated with a different motion sensor and each including a piston, means for converting the error signal in each motion sensor into a proportionate displacement of the piston in the associated ram, and a plurality of output means each adapted to be driven by a different piston and to drive the second member in an associated sensor in a direction to minimize the relative displacement between the first and second members in the sensor.

8. Positioning apparatus, including, input means, a motion sensor including first and second members movable relative to each other to produce an electrical signal having an amplitude proportional to their relative displacement, the first member being movable relative to the second member in accordance with the movements of the input means, a piston, means for converting the electrical signal into a proportionate movement of the piston, the second member being adapted to be displaced in accordance with movements of the piston and in a direction to minimize the amplitude of the electrical signal, control means adapted to be displaced in accordance with the movements of the piston, a plurality of first members each adapted to be driven by the control means from a neutral position, a plurality of output means each associated with a different first member, a plurality of second members each adapted to be driven by an associated output means from a neutral position so as to minimize any displacement between it and its associated first member, a plurality of motion sensors, each including a predetermined one of the first members and a predetermined one of the second members and adapted to produce an electrical signal having an amplitude substantially proportional to the relative displacement between the members, valve-controlled means for applying a force on each output means so as to produce a displacement of the output means, and means operative by each electrical signal to control the position of an associated valve-controlled means so as to vary the force applied on the output means and thereby to produce a displacement of each output means substantially proportionate to the displacement of the input means.

9. Positioning apparatus, including, input means, a motion sensor including first and second members movable relative to each other in a predetermined direction from a null position to provide alternating electrical signals having amplitudes substantially proportional to such relative movements, the first member being associated with the input means to follow the movements of the input means, a detector for converting the alternating electrical signals into proportionate direct signals, a hydraulic valve having a pair of pistons, a torque motor operative in accordance with the direct signals to produce a proportionate displacement of one of the valve pistons relative to the other piston, a ram, a piston in the ram adapted to be displaced in accordance with the displacement of the valve pistons and to drive the second member in the motion sensor in a direction to minimize the amplitude of the alternating electrical signals, a rotary converter adapted to be driven by the ram piston, a plurality of driven members associated with the rotary member to convert the angular movements of the rotary member into corresponding linear movements, a plurality of motion sensors each including first and second members movable relative to each other in a predetermined direction from a null position to provide alternating electrical signals having amplitudes substantially proportional to such relative movements, each of the first members in the plurality of motion sensors being associated with a different driven means to follow the movement of the driven means, a detector associated with each motion sensor for converting the alternating electrical signals generated in the motion sensor into proportionate direct signals, a plurality of hydraulic valves each having a pair of pistons and associated with a different detector, a plurality of torque motors each operative in accordance with the proportionate direct signals from an associated detector to produce a proportionate displacement of one of the valve pistons in an associated valve relative to the other piston in the valve, a plurality of rams each associated with a different torque motor in the plurality, a piston in each ram adapted to be displaced in accordance with the displacement of the associated valve pistons, and a plurality of output means each adapted to be driven by an associated ram piston and to drive the second member in an associated motion sensor in a direction to minimize the relative displacement between the first and second members in the sensor.

10. Positioning apparatus, including, input means, a motion sensor including first and second members movable relative to each other to generate an alternating electrical signal having an amplitude substantially proportional to the relative displacement between the members, the first member in the motion sensor being adapted to follow the movements of the input means to produce a relative displacement between it and the second member in the sensor, a detector for converting the alternating signal into a proportionate direct signal, a force-compensated valve, a torque motor for producing a flow of fluid through the valve in accordance with the amplitude of the direct signal, driving means operative in accordance with the flow of fluid through the valve to drive the second member in the motion sensor in a direction to minimize the amplitude of the generated signal, a rotary member coupled to the driving means to become angularly displaced in accordance with the movements of the driving means, a plurality of driven members coupled to the rotary member to be linearly driven through distances in accordance with the angular movements of the rotary member, a plurality of motion sensors each including first and second members movable relative to each other to generate an alternating electrical signal having an amplitude substantially proportional to the relative displacement between the members, the first member in each motion sensor being adapted to follow the movements of an associated driven member to produce a relative displacement between it and the second member in the sensor, a plurality of detectors each associated with a different motion sensor to convert into a proportionate direct signal the alternating signal generated by the sensor, a plurality of force-compensated valves each associated with a different detector, a plurality of torque motors each associated with a different valve to produce a flow of fluid through the valve in accordance with the amplitude of the direct signal from an associated detector, a plurality of output means each coupled to the second member in a different motion sensor, and a plurality of driving means each operative in accordance with the flow of fluid through an associated valve to drive an associated output means and the second member in an associated motion sensor in a direction to minimize the amplitude of the signal generated by the sensor.

11. Positioning apparatus, including, input means, a motion sensor including first and second members movable relative to each other to generate an alternating electrical signal having an amplitude substantially proportional to the relative displacement between the members, the first member in the motion sensor being adapted to follow the movement of the input means to produce a relative displacement between it and the second member, a detector for converting the alternating signal into a proportional direct signal, a valve, an annular sleeve in the valve, an annular piston having an oblique indentation in its annular surface to provide a force compensating for the force exerted by the piston in opposing a movement away from the sleeve, a torque motor actuated by the direct signal to produce a movement of the piston away from the sleeve so as to produce through the valve a flow of fluid proportionate to such piston displacement, driving means operative in accordance with the flow of fluid through the valve to drive the second member in the motion sensor in a direction to minimize the amplitude of the generated signal, a rotary member coupled to the driving means to be angularly displaced in accordance with the movements of the driving means, a plurality of driven members coupled to the rotary member to be linearly driven by the rotary member through distances dependent upon the angular movements of the rotary member, a plurality of motion sensors each including first and second members movable relative to each other to generate an alternating electrical signal having an amplitude substantially proportional to the relative displacement between the members, the first member in each motion sensor being adapted to follow the movement of an associated driven member to produce a relative displacement between it and the second member in the sensor, a plurality of detectors each associated with a different motion sensor to convert the alternating signal from the sensor into a proportionate direct signal, a plurality of valves each associated with a different detector, an annular sleeve in each valve, an annular piston in each valve having an oblique indentation in its annular surface to provide a force compensating for the force exerted by the piston in opposing a movement away from the sleeve, a plurality of torque motors each actuated by the direct signal from an associated detector to produce a movement of the piston away from the sleeve in an associated valve so as to produce through the valve a flow of fluid proportionate to such piston movement, a plurality of output means each coupled to the second member in an associated motion sensor, and a plurality of driving means each operative in accordance with the flow of fluid through an associated valve to drive an associated output means and the second member in an associated motion sensor in a direction to minimize the amplitude of the generated signal.

References Cited in the file of this patent

UNITED STATES PATENTS

| Number | Name | Date |
|---|---|---|
| 833,689 | Kitsee | Oct. 16, 1906 |
| 1,877,605 | Shivers | Sept. 13, 1932 |
| 2,437,603 | Hornfeck | Mar. 9, 1948 |